US008082060B2

(12) United States Patent
Wanner et al.

(10) Patent No.: US 8,082,060 B2

(45) Date of Patent: Dec. 20, 2011

(54) MAIL PROCESSING SYSTEM AND METHOD OF LOADING ARTICLES WITH REDUCED SPEED

(75) Inventors: Bertram Wanner, Meersburg (DE); Rolf-Peter Skrdlant, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 740 days.

(21) Appl. No.: 11/664,862

(22) PCT Filed: Oct. 31, 2005

(86) PCT No.: PCT/EP2005/011634

§ 371 (c)(1),
(2), (4) Date: Apr. 5, 2007

(87) PCT Pub. No.: WO2006/048217

PCT Pub. Date: May 11, 2006

(65) Prior Publication Data

US 2009/0012645 A1 Jan. 8, 2009

Related U.S. Application Data

(60) Provisional application No. 60/624,499, filed on Nov. 2, 2004.

(51) Int. Cl.
*G06F 7/00* (2006.01)

(52) U.S. Cl. ........................................................ 700/230

(58) Field of Classification Search .................. 700/230
See application file for complete search history.

(56) References Cited

U.S. PATENT DOCUMENTS

| | | | | | |
|---|---|---|---|---|---|
| 4,856,978 | A | | 8/1989 | Voss et al. | |
| 4,861,018 | A | | 8/1989 | Kerstein | |
| 5,199,550 | A | * | 4/1993 | Wachi et al. | 198/626.1 |
| 5,265,713 | A | * | 11/1993 | Marchadour | 198/524 |
| 5,267,826 | A | | 12/1993 | Peters | |
| 5,362,040 | A | | 11/1994 | Midavaine et al. | |
| 5,368,524 | A | | 11/1994 | Deemer et al. | |
| 5,749,456 | A | * | 5/1998 | Logie | 198/626.5 |
| 5,819,909 | A | | 10/1998 | Boller et al. | |
| 5,904,237 | A | | 5/1999 | Sander et al. | |
| 6,644,461 | B1 | | 11/2003 | Imbert et al. | |
| 2003/0038065 | A1 | | 2/2003 | Pippin et al. | |
| 2004/0016681 | A1 | | 1/2004 | Shiibashi et al. | |

FOREIGN PATENT DOCUMENTS

| | | | |
|---|---|---|---|
| EP | 0 499 458 | A2 | 8/1992 |
| WO | 9710904 | A1 | 3/1997 |
| WO | WO 00/78471 | A1 | 12/2000 |

* cited by examiner

*Primary Examiner* — Ramya Prakasam

(74) *Attorney, Agent, or Firm* — Laurence A. Greenberg; Werner H. Stemer; Ralph E. Locher

(57) ABSTRACT

A mail processing system has an infeed line coupled to receive a first article from a feeder. A loading device is coupled to receive the first article from the infeed line at a first speed, and a transfer unit is coupled to receive the first article from the loading device, wherein the transfer unit is configured to transport the first article at a second speed, which is lower than the first speed.

21 Claims, 5 Drawing Sheets

MAIL PROCESSING SYSTEM AND METHOD OF LOADING ARTICLES WITH REDUCED SPEED

CROSS REFERENCE TO RELATED APPLICATIONS

The present application claims priority to provisional patent application Ser. No. 60/624,499 filed on Nov. 2, 2004, which is herein incorporated by reference.

BACKGROUND OF THE INVENTION

The various embodiments described herein relate to a mail processing system and a method of loading articles onto a transport system.

Each day the United States Postal Service (USPS) processes articles for delivery to millions of individual domestic addresses. As used throughout the application, articles refer to mail items, magazines, books and other such flat items. Before mail carriers begin to walk through or drive through their delivery routes, a mail processing system at a USPS processing site sorts all articles for the carriers and packages the sorted articles for each domestic address. A carrier's responsibility includes putting all of these articles into an appropriate sequence for efficient delivery to the domestic addresses.

The mail processing system is highly automated to handle the amount of daily articles. It includes a delivery point packaging (DPP) system that, for example, separates the articles, reads their destination addresses and groups the articles based upon their respective destination addresses. One example of a DPP system includes an arrangement of a multitude of individual slots for individual articles. A transport system having containers with pockets transports the articles along a track system to the slots. Feeders or loaders insert the articles into the transport system at loading points. At this point, the destination address of an article is known and the transport system transports the article along a delivery path to a slot that is pre-assigned to the destination address of that article.

A general aspect of a mail processing system is to operate it as efficient and reliable as possible, but at the same time without causing any or too much damage to the articles. One area in the mail processing system that influences efficiency, reliability and potential damage are the loading points. For example, to achieve a high throughput a loader needs to insert an article into a pocket as fast as possible, and to load as many pockets as possible. Hence, the pockets on the transport system should be densely packed and have openings that are only slightly larger than the thickness of an article, but still wide enough to ensure safe and reliable loading.

Known techniques for loading the articles include, for example, 1) stopping the transport system, 2) feeding an article while the transport system moves and passes the loader, or 3) using a loader having a swivel arm that follows the moving transport system. However, these techniques require the transport system to generate high acceleration forces after each stop (1), the loader to insert the article with a high speed, which increases the risk of damage to the article, while the pocket opening needs to be relatively large (2), or the pocket openings need to be relatively large to compensate for any angle aberrations.

SUMMARY OF CERTAIN INVENTIVE ASPECTS

There is, therefore, a need for an improved technique for loading articles in a mail processing system so that it can operate as efficient and reliable as possible without causing any or too much damage to the articles.

Accordingly, one aspect involves a method of delivering articles to predetermined delivery locations within a mail processing system. A first article is transferred from an infeed line to a loading device at a first speed, and then from the loading device to a transfer unit. The transfer unit is controlled so that the first article moves at a second speed. The first article is transferred from the transfer unit to the first transport device at the second speed.

Another aspect involves a mail processing system having an infeed line coupled to receive a first article from a feeder. A loading device is coupled to receive the first article from the infeed line at a first speed, and a transfer unit is coupled to receive the first article from the loading device, wherein the transfer unit is configured to transport the first article at a second speed.

A further aspect involves a loader and indexer unit for a mail processing system. The loader and indexer unit includes an infeed line coupled to receive a first article from a feeder. A loading device is coupled to receive the first article from the infeed line at a first speed, and a transfer unit is coupled to receive the first article from the loading device. The transfer unit is configured to transport the first article at a second speed.

BRIEF DESCRIPTION OF THE DRAWINGS

These and other aspects, advantages and novel features of the embodiments described herein will become apparent upon reading the following detailed description and upon reference to the accompanying drawings. In the drawings; same elements have the same reference numerals.

DETAILED DESCRIPTION OF CERTAIN INVENTIVE EMBODIMENTS

Figure 1:
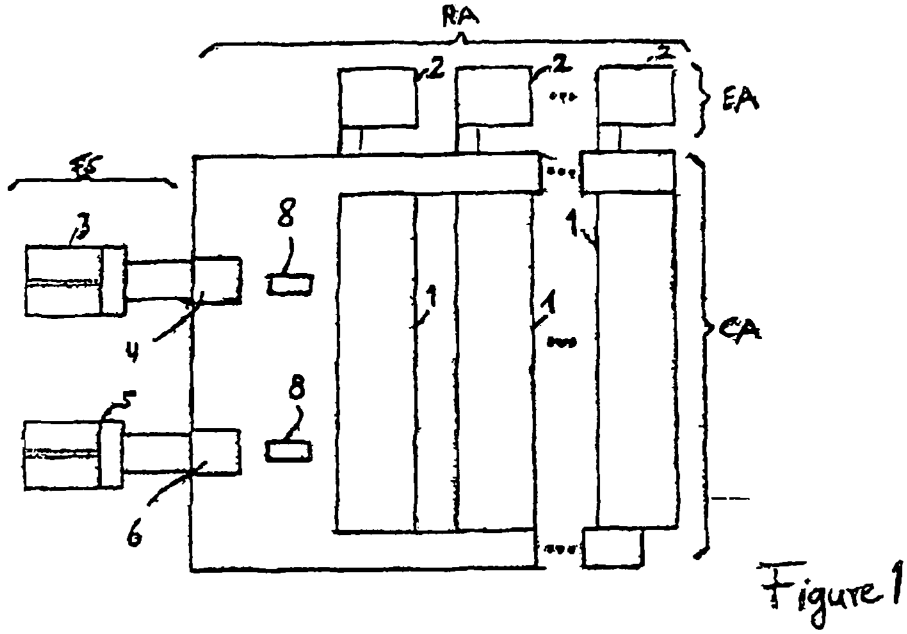
FIG. 1 shows a schematic overview of one embodiment of a mail processing system.

FIG. 1 shows a schematic illustration of one exemplary embodiment of a mail processing system to provide for a general overview of a mail processing system. The illustration depicts basic flows and functional relationships within the system. These basic flows and functional relationships are represented in FIG. 1 through functional blocks for a feeding section FS, a routing area RA, a casing area CA and an extraction area EA. These functional blocks represent some of the main functional features of the system. Those of ordinary skill in the art of mail processing systems will appreciate that the system may include a variety of other functional features. Further, it is contemplated that the separation into these functional blocks is arbitrary and that the blocks may be shown in a different arrangement without affecting the principal operation of the system. A more detailed description of one embodiment of the system and its structural components follows.

Briefly, the feeding section FS separates individual articles from batches to identify their individual destination addresses. For that purpose, the feeding section FS includes in one embodiment feeders 3, 5 and optical character readers (OCR) or bar code readers, or a combination of these readers (see also FIG. 2). After a successful identification of the destination addresses, the feeder section FS hands the articles to the routing area RA. The routing area RA includes loading points 4, 6 coupled to the feeders 3, 5 and an infrastructure that transports the articles according to their destination addresses to the casing area CA. The casing area CA is embedded in the routing area RA and includes a predetermined number of casing towers 1 that have slots for the articles. Each slot represents an individual destination address. Once the articles are delivered to the slots, extraction and packaging modules 2 in the extraction area EA extract the articles from the slots and pack the articles on a per destination address basis.

The infrastructure includes, among other elements, elevators and transport devices 8, such as transport vehicles 8, for example, automatic inserter transport vehicles, hereinafter referred to as ANTs 8, that transport the articles in pockets. A summary of the general operation of an ANT 8 is set forth below. In one embodiment, the system may include several hundred ANTs 8. Those of ordinary skill in the art will appreciate that such ANTs 8 are only examples of transport devices, and that other transport devices, such as containers on a belt system, may be used, as well.

Figure 2:
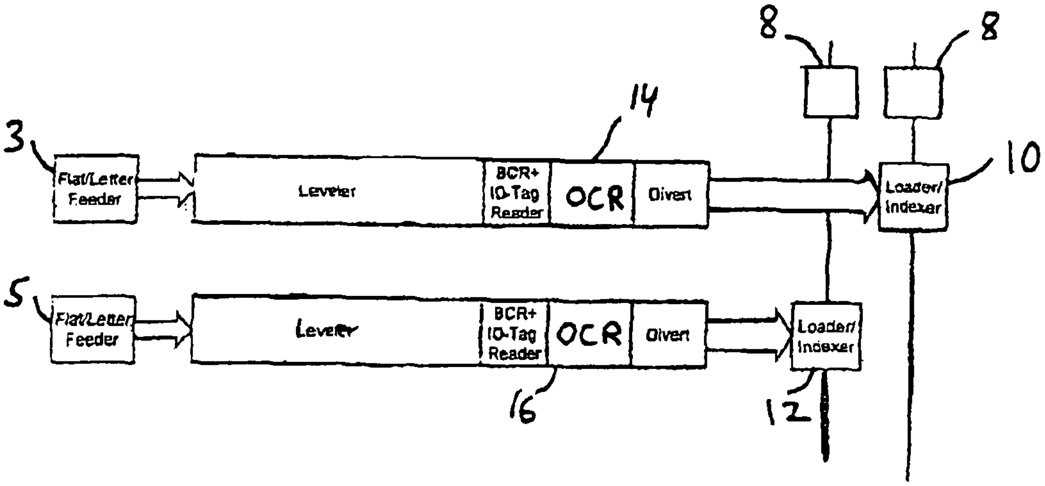
FIG. 2 illustrates an interface section between the feeder section and the routing area of the mail processing system.

The various embodiments of the mail processing system described hereinafter relate mainly to the feeder section and the routing area. Accordingly, FIG. 2 illustrates an exemplary interface section between the feeder section FS and the routing area RA. More particularly, an infeed line 14 interfaces the feeder 3 and a loader-indexer unit 10, and an infeed line 16 interfaces the feeder 5 and a loader-indexer unit 12. Each infeed line 14, 16 includes, among other features, a leveler, a bar code reader (BCR) and an ID tag reader, an OCR and a diverter. Hence, when an article leaves the infeed line 14, 16 its destination address is available and is ready for handing over to an ANT 8 of the transport system.

The function of each loader-indexer unit 10, 12 is to transition the articles from infeed line transport belts to the ANT 8. The loader-indexer units 10, 12 are each positioned in the path of an ANT 8. The articles move from the feeders 3, 5 via the belts of the infeed lines 14, 16 to the loader-indexer unit 12, in FIG. 2 from left to right, whereas the ANTs 8 move in a direction that is substantially perpendicular to the articles' direction of movement. The indexer of a loader-indexer unit 10, 12 controls the speed and position of the ANT 8 inside the indexer. The loader of a loader-indexer unit 10, 12 receives the article from the infeed line 14, 16, controls the speed of the article and loads it by means of a loading device, e.g., a swiveling arm, and a transfer unit that moves parallel to the ANT 8, as described below in more detail, into the ANT 8. Speed control inside the loader may include the requirement to reduce the article's speed at the end of the loading process into the ANT 8. Reducing the speed reduces the kinetic energy that needs to be absorbed in the ANT 8, and, hence, reduces the risk of damage to the article.

Figure 3:
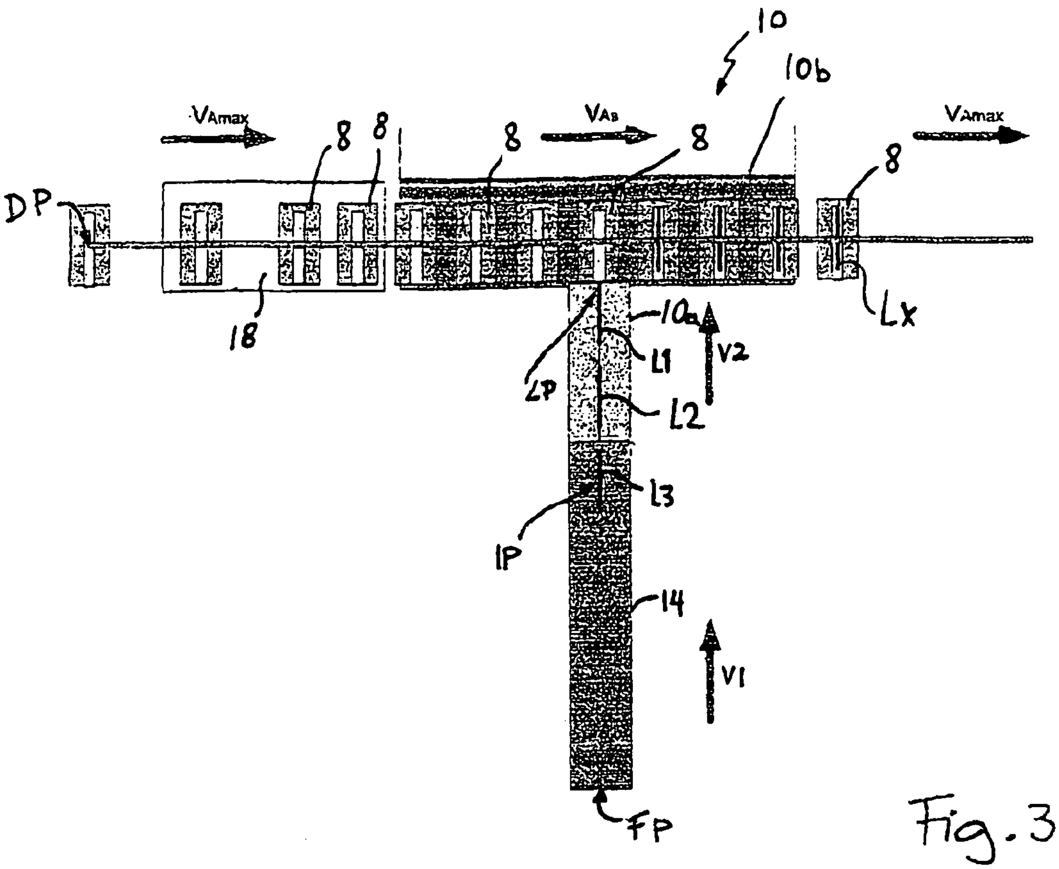
FIG. 3 is a schematic illustration of a loading and indexing process.

FIG. 3 is an illustration of a loading and indexing process occurring within the interface section of FIG. 2. The exemplary illustrated loader-indexer unit 10 coupled to the infeed line 14 is now shown with a separate loader 10*a* and a separate indexer 10*b*. It is contemplated that the loader-indexer unit 12 coupled to the infeed line 16 has substantially the same structure and function. In addition, a buffer 18 is coupled to the indexer 10*b* and a plurality of ANTs 8 travel in FIG. 3 from left to right, first through the buffer 18 and then through the indexer 10*b*, where each ANT 8 is loaded with one article. For illustrative purposes, the articles (e.g., letters) are labeled as L1, L2 and L3, wherein the article L1 is the next to be loaded onto an ANT 8.

The loader 10*a* is the transport interface to the infeed line 14 and takes over articles from the infeed line transport belts. It transports an article until its trailing edge has left the loader at the ANT interface. This function also includes the synchronization of the transport speed with the infeed transport speed. In certain embodiments, it may not be desired to reach the final article position within the ANT 8 with full speed. Hence, the speed may have to be adjusted, e.g., reduced, at the end of the insertion process, but prior to transferring the article to the ANT 8, so as to reduce its kinetic energy, as mentioned above. Also, the loader 10*a* is responsible for controlling an ANT 8 to provide access to a pocket, i.e., to open a pocket. The loader 10*a* further synchronizes and aligns itself with the moving ANT 8. The loading process into the ANT 8 starts, when the front edge of the article leaves the loader, and ends when the rear edge of the article has left the loader 10*a*.

Several points may be defined to characterize or describe the loading and indexing process. A feed point FP is at an interface between the feeder 3 and the infeed line 14, and is the location where the front edge of the article is traveling at a predetermined and constant transport speed. A load point LP is at an interface between the loader 10*a* and the indexer 10*b* and, hence, at a location where the article's trailing edge has cleared the loader 10*a*. Once the article left the loader 10*a*, the loader 10*a* or the ANT 8 are then ready for the next cycle. A decision point DP is in proximity of an entry into the buffer 18, and defined as a projection of the article's travel time from the feed point FP to the load point LP onto the track of the ANT 8. Ideally an ANT 8 reaches the decision point DP when an article is ready at the feed point FP, the article and this ANT 8 will meet at the load point LP just in time for loading the article onto the ANT 8. When the article is fed after the ANT 8 has passed the decision point DP the ANT 8 has to wait in the buffer 18. An index point IP is defined within the infeed line 14 in proximity of a transition to the loader 10*a*. When an article reaches the index point IP the indexer 10*b* starts taking over an ANT 8 at the interface to the buffer 18.

When an ANT 8 enters the area between the decision point DP and the transition to the indexer 10*b* an article is fed at the feed point FP. When the article is fed and the ANT 8 is exactly at the decision point DP it proceeds through the loading cycle without additional delay. However, if an article is fed after the decision point DP the ANT 8 has to stop and wait. In order to eliminate tolerances in the article's travel time between the decision point DP and the transition to the indexer 10*b* the ANT 8 stops in one embodiment at the end of the buffer 18 in any case.

An article enters the infeed line 14 at the feed point FP with the front edge traveling at a transport speed V1. The article travels through the infeed line 14 until the leading edge reaches the load point LP. The ANT 8 should then be ready to be loaded at this point. Transport of the article at a constant speed (V1) continues until its rear edge reaches in one embodiment a deceleration point within a transfer unit (see FIG. 4). The article is then decelerated to a reduced speed V2. Until the article has cleared the loader 10*a* it travels with speed V2. Once the load point LP is passed the next ANT 8 and the loader 10*a* are brought into the loading state ready to receive the next article. The loading state is reached, when the pocket opening of the ANT 8 and the output opening of the loader 10*a* match and the loader 10*a* operates at transport speed V1.

Prior to the indexer 10*b*, the control system of the infeed section synchronizes ANTs and the feed process. Articles that pass the index point IP trigger the indexer 10*b* to take over an ANT 8 waiting at the end of the buffer 18. The speed of the ANT 8 is zero (V=0). During the transition from the buffer 18 to the indexer 10*b* the ANT drive is initially switched off and then turned on. The ANT 8 accelerates to a predetermined speed (see also FIG. 6) with its own drive and is then transferred to the indexer 10*b*. After the transition is complete the indexer 10*b* brings the ANT 8 into a loading state and keeps the ANT 8 in the loading state during loading. When the loading is complete, the ANT 8 is accelerated to $V_{Amax}$ and transferred to autonomous travel. Hence, the indexer 10*b* transitions ANTs 8 from autonomous travel into restricted guidance, compensates position tolerances occurring between the decision point DP and the ANT's transition to restricted guidance, and transitions the ANTs 8 from restricted guidance to autonomous travel. The indexing process starts when an ANT 8 reaches the transfer area. The loading process starts when the front edge of a mail piece enters the ANT 8. Correspondingly, the loading process is deemed to be finished as soon as the rear edge leaves the loader.

Figure 4:
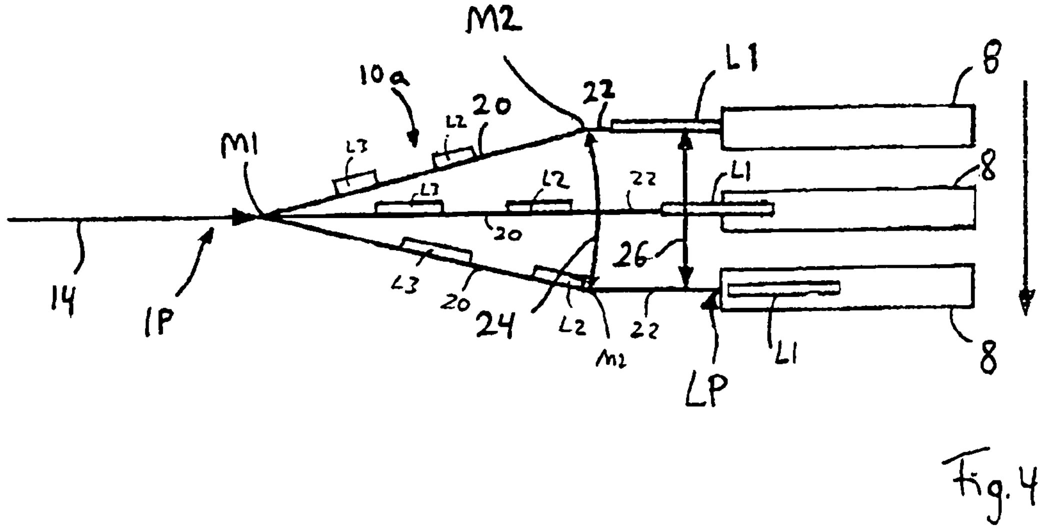
FIG. 4 is a schematic illustration of the loading process by means of a loading device.

FIG. 4 is a schematic illustration of one embodiment of the loading process by means of a loading device 20, e.g., a loading arm 20, that is part of the loader 10*a*, as mentioned above. The loading arm 20 is pivotally-coupled to the infeed line 14, with a center of motion M1 being close to the interface between the infeed line 14 and the loader 10*a*. In addition, the loader 10*a* includes a transfer unit 22, or a decelerator 22, coupled to the loading arm 20 at a center of motion M2. The transfer unit 22 is linearly moveable parallel and synchronous to an ANT 8, for example, by means of a guide system that extends substantially parallel to the ANT's 8 path. The loading arm's pivotal movement is indicated through a double arrow 24, and the transfer unit's back and forth movements are indicated through a double arrow 26. The loading arm 20 is coupled to the transfer unit 22. A drive actuating the back and forth movement is coupled to the transfer unit 22.

The loading arm 20 may be configured as a symmetrical arrangement, as shown in FIG. 4. That is, the loading arm 20 moves back and forth between a first limit and a second limit. In one embodiment, the loading arm 20 includes an angle of about 6° between the first and second limits when moving with respect to the center of motion M1. With respect to the infeed line 14, which is substantially perpendicular to the ANT's 8 path, the loading arm 20 pivots about the center of motion M1, for example, by an angle of about +/−3°. Depending on the actual angle while receiving an article, the article has to turn left or right (as seen from the perspective of the article's direction of movement) when passing the centers of motion M1 and M2. As the transfer unit 22 moves parallel to an ANT 8, the article is loaded straight into the ANT.

To avoid the article having to turn left or right at the center of motion M1, the infeed line 14 may be positioned at an angle with respect to the regular position of the loading arm 20. For example, in an embodiment similar to that of FIG. 4, the infeed line 14 may be angled so as to be inline with the "upper most" position of the loading arm 20. In that case, when an article passes the center of motion M1, it moves straight or to the right only. At the center of motion M2, the article moves straight or turns left or right, depending on the angle the infeed line 14 encloses with the path of the ANT 8. The article, however, is still loaded straight into the ANT 8 by means of the transfer unit 22 that moves parallel and synchronous with the ANT 8.

Figure 5:
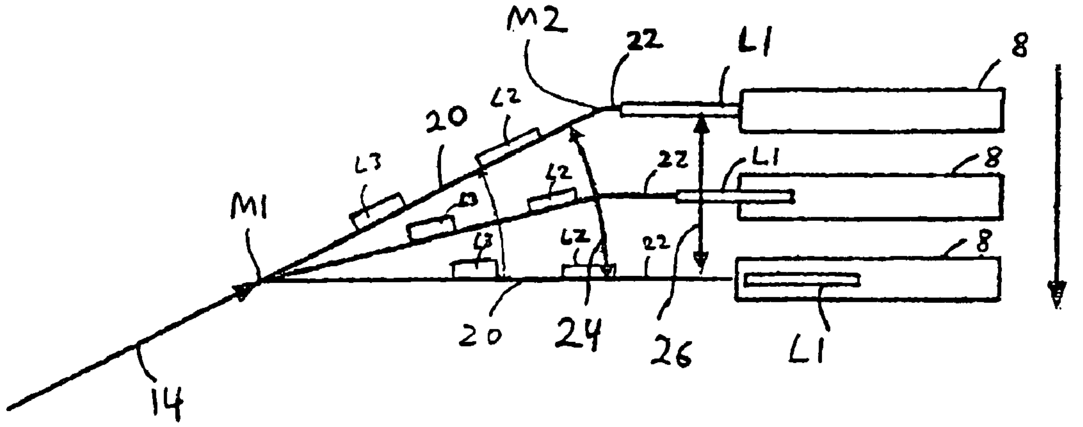
FIG. 5 illustrates a second embodiment of a loading device.

FIG. 5 is a schematic illustration of another embodiment of the loading process by means of a pivotally coupled loading arm 20. Unlike in FIG. 4, the infeed line 14 is angled with respect to the path of the ANT 8, so that the infeed line 14 and the ANT's path include an acute angle. An article passing the center of motion M1 or the center of motion M2 moves straight or turns always to the right. Since the article moves either straight or turns into only one direction, the risk of damage or slippage to the article is reduced while traveling through the loader. In this embodiment, the article is also loaded straight into the ANT 8 by means of the transfer unit 22, which moves on a linear guide parallel to the ANT 8 and is coupled to the loading arm 20. In one embodiment, the transfer unit 22 pulls the loading arm 20 with it. The transfer unit 22 may be configured as a deceleration unit that slows down an article before it is inserted into the ANT's pocket to reduce the likelihood of damage to the article, as described with respect to FIG. 7.

Figure 6:
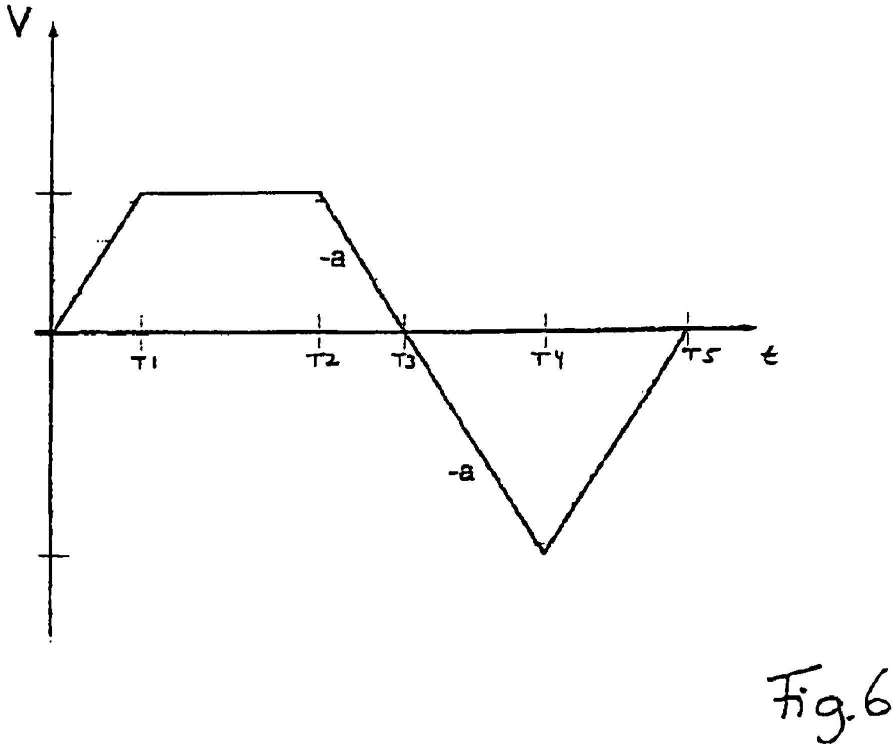
FIG. 6 is a graph illustrating the speed as a function of time.

FIG. 6 is a graph illustrating the speed of the transfer unit 22 as a function of time. A drive accelerates the transfer unit 22 during a first phase until the speed $V_{AS}$ of the transfer unit 22 is the same as the speed of the ANT 8 at T1. At the same time, the drive has aligned the transfer unit 22 to the moving ANT 8 so that the transfer unit 22 moves next to the ANT 8. In a subsequent second phase between T1 and T2, the drive moves the transfer unit 22 at a constant speed $V_{AS}$. During this second phase, the transfer unit 22 moves parallel to the ANT 8 and transfers the article to the ANT 8. After the transfer, in a third phase between T2 and T3, the drive slows the transfer unit 22 down until it stops at T3 (V=0). Subsequently, the drive accelerates the transfer unit 22 in the opposite direction until T4, and slows it down so that the transfer unit 22 is returned to its original position and is ready for the next loading cycle at T5.

Figure 7:
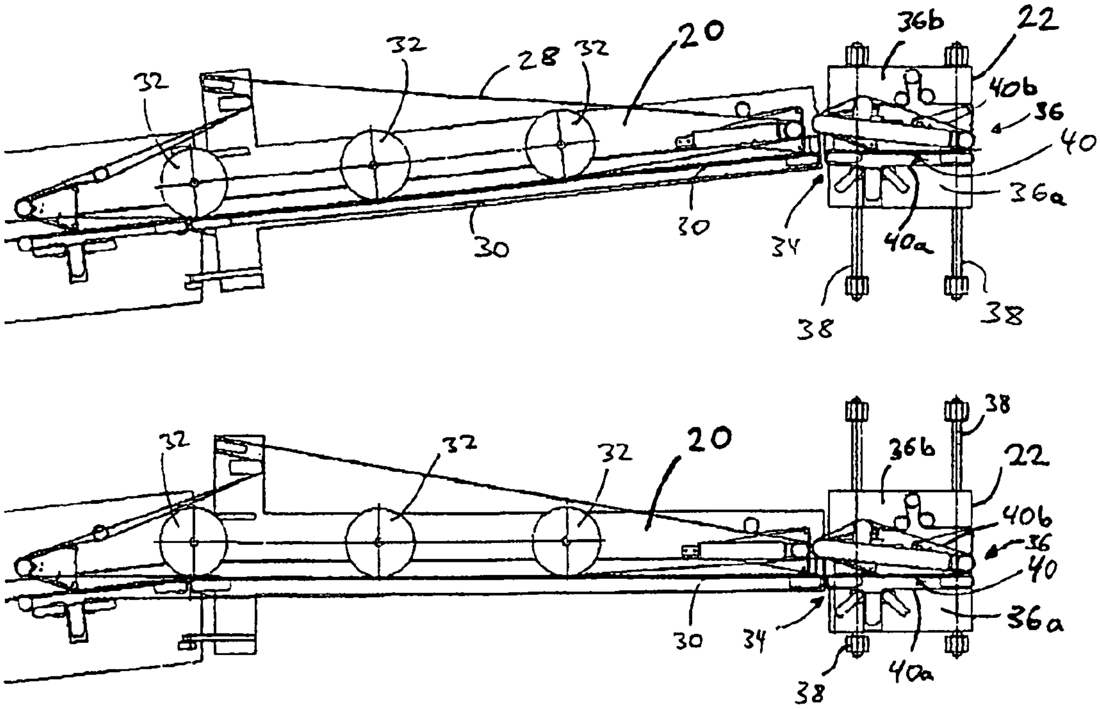
FIG. 7 is a more detailed illustration of one embodiment of a loading device and transfer unit.

FIG. 7 is a more detailed illustration of one embodiment of the loading device 20 and the transfer unit 22. In FIG. 7 the articles move from the left side to the right side. The loading device 20 includes a belt system including a pair of belts 28, 30 that grip the articles during their transfer through the loading device 20. Rollers 32 are flexibly mounted to bias the belts 28, 30 against each other, but also to accommodate articles of varying thickness. In the illustrated embodiment, the rollers 32 guide the belt 28 in a closed loop. The belt 30 is also configured as a closed loop. A coupling 34 couples the loading device 20 to the transfer unit 22. The coupling 34 is configured to moveably connect the two components (20, 22) and to allow the transfer unit 22 to "pull" the loading device 20 with it.

In one embodiment, the transfer unit 22 includes a belt system 40 mounted on a structure 36 that is movably mounted to a pair of parallel guide rails 38. The respective ends of the guide rails 38 limit the movement of the structure 36 in each direction. The structure includes a first transport unit 36*a* (master sled) and a second transport unit 36*b* (slave sled) that are each mounted on the guide rails 38. Each transport unit 36*a*, 36*b* is coupled to a servo drive that controls the operation (e.g., the movement) of the respective transport unit 36*a*, 36*b*.

The first transport unit 36*a*, in transport direction of the articles positioned to the right, is assigned to follow the ANT 8. This allows performing the loading process without interruption. The first transport unit 36*a* includes a first belt 40*a* (right belt) of the belt system 40 for transporting the article. The second transport unit 36*b* moves on the guide rails 38 independently of the first transport device 36*b*. Further, the second transport device 36*b* includes a second belt 40*b* (left belt). These belts 40*a*, 40*b* receive an article between them and forward the article to the ANT 8. Hence, the speed of the belts 40*a*, 40*b* determines the speed the article enters the ANT 8. The speed can be adjusted, for example, reduced, to slow down the article and thus reduce the kinetic energy the ANT 8 needs to absorb. The pockets that receive the articles may be provided with attenuating means to absorb the remaining kinetic energy. This further reduces the risk of damage to the articles and advantageously reduces the noise level, as well.

Before an article enters the transfer unit 22, the distance between the first and second transport units 36*a*, 36*b* is adjusted to the thickness of the article. This allows applying the force necessary for transporting the article between the belts 40*a*, 40*b*. For example, prior to accelerating the article, the distance is reduced to generate an increased force. This process is controlled by measuring the force directly at the second transport device 36*b*, or indirectly by means of controlling the torque or the current of the servo drive.

Figure 8:
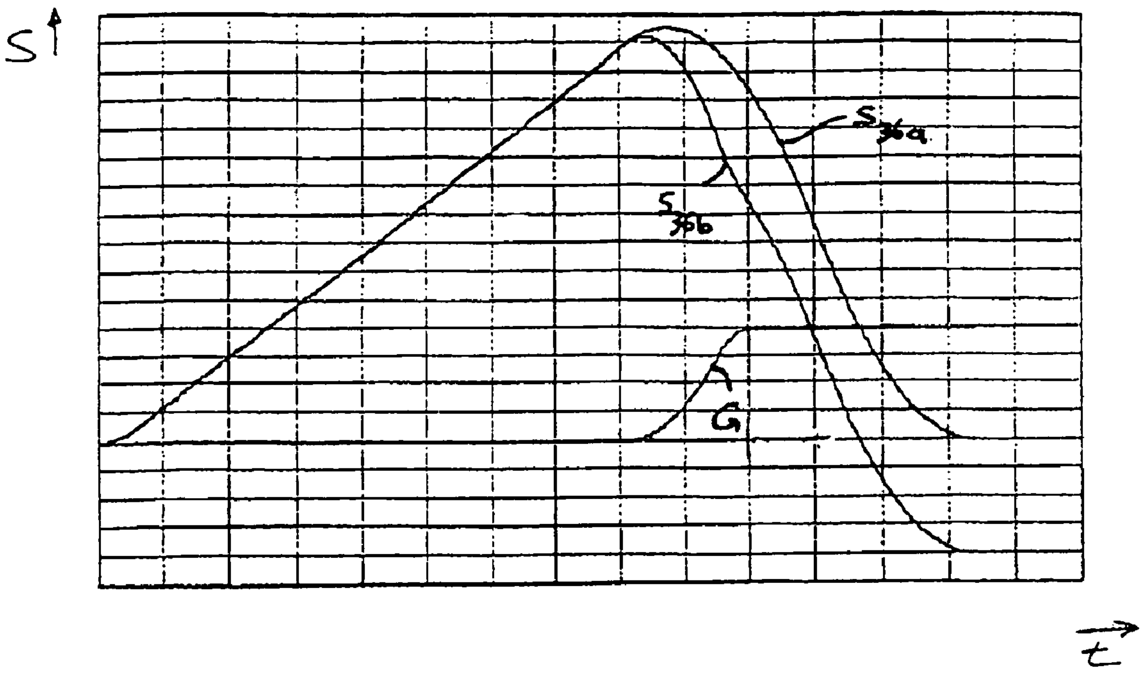
FIG. 8 illustrate graphs indicating paths transport devices travel as a function of time.

FIG. 8 illustrates graphs representing the distances the transport units 36*a*, 36*b* travel over time, $S_{36a}(t)$, $S_{36b}(t)$. In this illustration it is assumed that an article having a minimal thickness is received and decelerated first, and that then a thicker article follows. Initially, the transport unit 36*a*, 36*b* travel synchronously until the article between the belts 40*a*, 40*b* has been decelerated, at about $T_S$. Then, the second transport unit 36*b* starts to reduce its speed before the first transport unit 36*a* does. This causes a gap between the transport devices 36*a*, 36*b* to open into which the thicker article can enter. FIG. 8 illustrates further the width of the gap as a function of time, G(t). As illustrated, the gap opens between about $T_S$ and $T_G$. It is contemplated that the width of the gap is reduced once the thicker article is received to apply the required force.

As mentioned above, the ANT 8 is in one embodiment an autonomous vehicle designed to carry one article from one of two loading points and deliver it to one of many delivery point slots. To perform this task the ANT 8 includes communications equipment that provides for communications between the ANT 8 and the system acting as a host. The transport system moves the ANTs 8 within the mail processing system. Within the transport system the ANTs 8 travel on a track system. In one embodiment, the track system is based on a monorail that serves as a railway for the ANTs 8. The track system includes switches that allow the ANTs 8 to change from one rail path to another. For example, as the ANT 8 approaches a switch it sends a signal to the switch that indicates the desired direction. The switch “knows” its own switch position, processes the indicated direction and changes its switch position, if necessary, to divert the ANT 8 to the appropriate rail.

It is apparent that there has been disclosed a mail processing system and a method of delivering articles to predetermined delivery locations within the mail processing system that fully satisfies the objects, means, and advantages set forth hereinbefore. For example, the embodiments resolve conflicting objectives. To achieve a high throughput the articles need to travel at a high speed, but a high speed, i.e., high kinetic energy, increases the risk that the articles are damaged. As described, the transfer unit 22 reduces the kinetic energy of the articles is reduced as much as possible so as to avoid damage to the article when deposited in a pocket of an ANT 8. However, the throughput is improved and achieves in one embodiment three articles per second within a distance of about 400 mm. The reduced speed allows further more accurate positioning of the transfer unit 22 with respect to the ANT 8. This improves the reliability of the transfer process into the ANT 8.

Advantageously, the reduced kinetic energy reduces the noise level, as well. In addition, the articles can be fed to the ANTs 8 along a substantially straight path, which occurs irrespective of the size or shape of the article. Further, during the process of transferring an article from the transfer unit 22 to the ANT 8 the interface characteristics, such as gaps or angle, between these two devices (8, 22) do not change. This makes the transfer process more reliable. While specific embodiments of the system and method have been described, it is evident that many alternatives, modifications, and variations will be apparent to those skilled in the art in light of the foregoing description.

The invention claimed is:

1. A method of delivering mail articles to predetermined delivery locations, comprising:

moving at least one vehicle from a loading point to a delivery point;

transferring a first mail article from an infeed line to a loading device at a first speed;

transferring the first mail article from the loading device to a transfer unit;

controlling the transfer unit so that the first mail article moves at a second speed;

moving the transfer unit linearly and parallel to the vehicle’s path and synchronous with the at least one vehicle, pivoting a loading arm of the loading device, said loading arm being pivotally coupled to the infeed line, with the loading arm’s pivot being close to the interface between the infeed line and the loading arm, wherein the pivoting speed of the loading arm corresponds to the linear speed of the transfer unit such that the loading arm’s end that is remote from the pivot, stands coupled to the transfer unit as the transfer unit moves parallel to the at least one vehicle.

2. The method of claim 1, wherein the second speed is lower than the first speed.

3. The method of claim 1, further comprising receiving the first article between a first belt and a second belt.

4. The method of claim 3, further comprising adjusting a distance between the first belt and the second belt to set a force for transporting the first article.

5. The method of claim 4, further comprising reducing the distance between the first belt and the second belt to increase the force acting upon the first article.

6. The method of claim 4, wherein adjusting the distance includes moving a first transport unit supporting the first belt and moving a second transport unit supporting the second belt independently of each other.

7. The method of claim 6, wherein moving the first and second transport units includes moving them at different speeds to cause the first and second belts to separate for receiving an article therebetween.

8. The method of claim 1, wherein the first transport unit moves substantially perpendicularly to a direction of movement of the first article on the infeed line.

9. The method of claim 1, further comprising providing the infeed line with at least one device selected from the group consisting of an optical character reader and a bar code reader.

10. The method of claim 1, wherein an indexer transitions the at least one vehicle from autonomous travel into restricted guidance, provides restricted guidance, and transitions the at least one vehicle form restricted guidance to autonomous travel, and wherein the transfer unit is moved linearly and parallel coupled to the vehicle's path and synchronous with the at least one vehicle during restricted guidance provided by said indexer.

11. A mail processing system, comprising:

at least one vehicle designed to carry a mail article from a loading point to a delivery point;

an infeed line coupled to receive a first mail article from a feeder;

a loading device coupled to receive the first mail article from the infeed line at a first speed; and a transfer unit coupled to receive the first mail article from the loading device, wherein the transfer unit is configured to transport the first mail article at a second speed;

wherein the transfer unit is linearly moveable parallel to the vehicle's path and synchronous with the at least one vehicle, wherein the loading device comprises a loading arm pivotally coupled to the infeed line, with the loading arm's pivot being close to the interface between the infeed line and the loading arm, wherein the swing speed of the loading arm corresponds to the linear speed of the transfer unit such that the loading arm's end that is remote from the pivot, stands coupled to the transfer unit as the transfer unit moves parallel to the at least one vehicle.

12. The system of claim 11, further comprising a first transport device configured to move in proximity of the transfer unit along a first linear path, wherein the transfer unit is configured to transfer the first article to the first transport device at the second speed.

13. The system of claim 11, wherein the second speed is lower than the first speed.

14. The system of claim 11, wherein the transfer unit comprises a first transport unit supporting a first belt and a second transport unit supporting a second belt, wherein the first and second belts are configured to receive the first article therebetween and to transport the first article by moving the belts.

15. The system of claim 14, wherein the transfer unit is configured to adjust a distance between the first belt and the second belt to set a force for transporting the first article.

16. The system method of claim 15, wherein the transfer unit is configured to reduce the distance between the first belt and the second belt to increase the force acting upon the first article.

17. The system of claim 16, wherein the transfer unit is configured to adjust the distance by moving the first transport unit supporting the first belt and moving a second transport unit supporting the second belt with respect to each other.

18. The system of claim 17, wherein moving the first and second transport units includes moving them at different speeds to cause the first and second belts to separate for receiving an article therebetween.

19. The system of claim 11, wherein the transfer unit moves substantially perpendicularly to a direction of movement of the first article on the infeed line.

20. The system of claim 11, further comprising at least one device selected from the group consisting of an optical character reader and a bar code reader; the at least one device located at the infeed line.

21. The system of claim 11, wherein the at least one vehicle is capable of autonomous travel, wherein the system further comprises an indexer which is adapted to transition the at least one vehicle from autonomous travel into restricted guidance, adapted to provide restricted guidance, and adapted to transition the at least one vehicle from restricted guidance to autonomous travel, and wherein the transfer unit is linearly and parallel coupled to the vehicle's path and synchronous with the at least one vehicle during restricted guidance provided by said indexer.

* * * * *